US012775159B2

(12) United States Patent
Oogushi et al.

(10) Patent No.: US 12,775,159 B2
(45) Date of Patent: Oct. 27, 2026

(54) LASER BEAM SCANNING DEVICE AND LASER BEAM SCANNING METHOD

(71) Applicant: Kawasaki Jukogyo Kabushiki Kaisha, Kobe (JP)

(72) Inventors: Osami Oogushi, Kobe (JP); Mutsuhiro Nakazawa, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 426 days.

(21) Appl. No.: 18/575,095

(22) PCT Filed: Jul. 4, 2022

(86) PCT No.: PCT/JP2022/026558
§ 371 (c)(1),
(2) Date: Aug. 5, 2024

(87) PCT Pub. No.: WO2023/282223
PCT Pub. Date: Jan. 12, 2023

(65) Prior Publication Data
US 2024/0418984 A1 Dec. 19, 2024

(30) Foreign Application Priority Data
Jul. 7, 2021 (JP) ................................ 2021-112487

(51) Int. Cl.
*G02B 26/08* (2006.01)
*G02B 19/00* (2006.01)
*G02B 26/12* (2006.01)

(52) U.S. Cl.
CPC ....... *G02B 26/124* (2013.01); *G02B 19/0009* (2013.01); *G02B 19/0047* (2013.01); *G02B 26/125* (2013.01)

(58) Field of Classification Search
CPC .............. G02B 26/124; G02B 19/0009; G02B 19/0047; G02B 26/125; G02B 26/10;
(Continued)

(56) References Cited

U.S. PATENT DOCUMENTS 5,546,215 A 8/1996 Ota
2010/0110517 A1* 5/2010 Shikii .................. G02B 26/123 359/205.1
(Continued)

FOREIGN PATENT DOCUMENTS

CN 103439795 12/2013
CN 112352186 2/2021
(Continued)

*Primary Examiner* — Euncha P Cherry
(74) *Attorney, Agent, or Firm* — Fay Kaplun & Marcin, LLP

(57) ABSTRACT

A laser scanning device includes a first light guide part, a polygon mirror, and a second light guide part. The first light guide part reflects and guides a laser generated by a laser generator. The polygon mirror has reflective surfaces arranged in a polygonal shape and reflects the laser guided by the first light guide part on the reflective surface while rotating. The second light guide part reflects the laser reflected by the reflective surface of the polygon mirror and guides the laser so that the laser is irradiated to a workpiece. The first light guide part includes a first cylindrical lens for condensing the laser so that the beam diameter in the first direction of the laser becomes smaller. The second light guide part includes a second cylindrical lens (43) for condensing the laser so that the beam diameter in the second direction perpendicular to the first direction of the laser becomes smaller.

3 Claims, 4 Drawing Sheets

(58) Field of Classification Search
CPC .... G02B 26/12; B23K 26/064; B23K 26/082; B23K 26/0643; B23K 26/0648
See application file for complete search history.

(56) References Cited

U.S. PATENT DOCUMENTS

| | | | |
|---|---|---|---|
| 2014/0111591 | A1 | 4/2014 | Kim |
| 2021/0260695 | A1 | 8/2021 | Nakazawa |

FOREIGN PATENT DOCUMENTS

| | | |
|---|---|---|
| JP | 6-18803 | 1/1994 |
| JP | 5401629 | 1/2014 |
| WO | 2012/120892 | 9/2012 |
| WO | 2017/191777 | 11/2017 |

* cited by examiner

LASER BEAM SCANNING DEVICE AND LASER BEAM SCANNING METHOD

PRIORITY DATA

The present application is a 371 application of PCT Patent Application Serial No. PCT/JP2022/026558 filed on Jul. 4, 2024; which claims priority to Japanese Patent Application Serial No. 2021-112487 filed on Jul. 7, 2021. The disclosure of the above application is incorporated herein by reference.

TECHNICAL FIELD

This invention relates primarily to a laser beam scanning device.

BACKGROUND ART

PTL 1 discloses a light scanning device that scans light such a laser. The light scanning device includes a lens, a plurality of folding mirrors, a polygon mirror, a first mirror, a second mirror, and a cylindrical lens. The lens focuses the laser light generated by a laser generator. The plurality of folding mirrors ensure an optical path length to focus the laser on a workpiece, and guide the laser to the polygon mirror. The polygon mirror reflects the laser while rotating, thereby reflecting the laser at a reflection angle that corresponds to the rotational phase of the polygon mirror. The laser reflected by the polygon mirror is reflected by the first mirror and the second mirror, passes through the cylindrical lens, and is irradiated to a workpiece. The cylindrical lens is used to flatten the laser.

PRIOR-ART DOCUMENTS

Patent Documents

PTL 1: Japanese Patent No. 5401629

SUMMARY OF THE INVENTION

Problems to be Solved by the Invention

In the optical scanning device of PTL 1, depending on the shape of the lens, there is a possibility that the laser beam irradiated to the workpiece is not sufficiently focused in a predetermined direction.

The present invention was made in view of the above circumstances, and its main purpose is to provide a laser scanning device that can irradiate a workpiece with a properly focused laser beam.

Means for Solving the Problems

The problem to be solved by the present invention is as described above, and the means for solving this problem and effects are described below.

According to a first aspect of the present invention, a following laser scanning device is provided. That is, the laser scanning device includes a first light guide part, a polygon mirror, and a second light guide part. The first light guide part reflects and guides a laser generated by a laser generator. The polygon mirror has a reflective surface arranged in a polygonal shape and reflects the laser guided by the first light guide part on the reflective surface while rotating. The second light guide part reflects the laser reflected by the reflective surface of the polygon mirror and guides the laser so that the laser is irradiated to a workpiece. The first light guide part includes a first condense part that condenses the laser so that the beam diameter in a first direction of the laser becomes smaller. The second light guide part includes a second condense part that condenses the laser so that a beam diameter in a second direction perpendicular to the first direction of the laser becomes smaller.

According to a second aspect of the present invention, a following laser scanning method is provided. That is, the laser scanning method includes a first light guide process, a polygon mirror reflect process, and a second light guide process. In the first light guide process, a laser generated by a laser generator is reflected and guided by using a first light guide part. In the polygon mirror reflect process, the laser guided by the first light guide part is reflected while rotating by using a polygon mirror having reflective surfaces arranged in a polygonal shape. In the second light guide process, the laser reflected by the reflective surface of the polygon mirror is guided so that the second light guide part reflects and guides the laser and the laser is irradiated to a workpiece. The first light guide process includes a process for condensing the laser so that the beam diameter in a first direction of the laser becomes smaller by using a first condense part. The second light guide process includes a process for condensing the laser so that a beam diameter in a second direction perpendicular to the first direction of the laser becomes smaller by using a second condense part.

As a result, the laser generated by the laser generator is focused in two directions, so the workpiece can be irradiated with a laser whose cross-sectional shape (beam shape) is circular or close to it.

Effects of the Invention

The invention enable a laser beam to irradiate a workpiece with a properly focused laser beam.

EMBODIMENT FOR CARRYING OUT THE INVENTION

Figure 1:
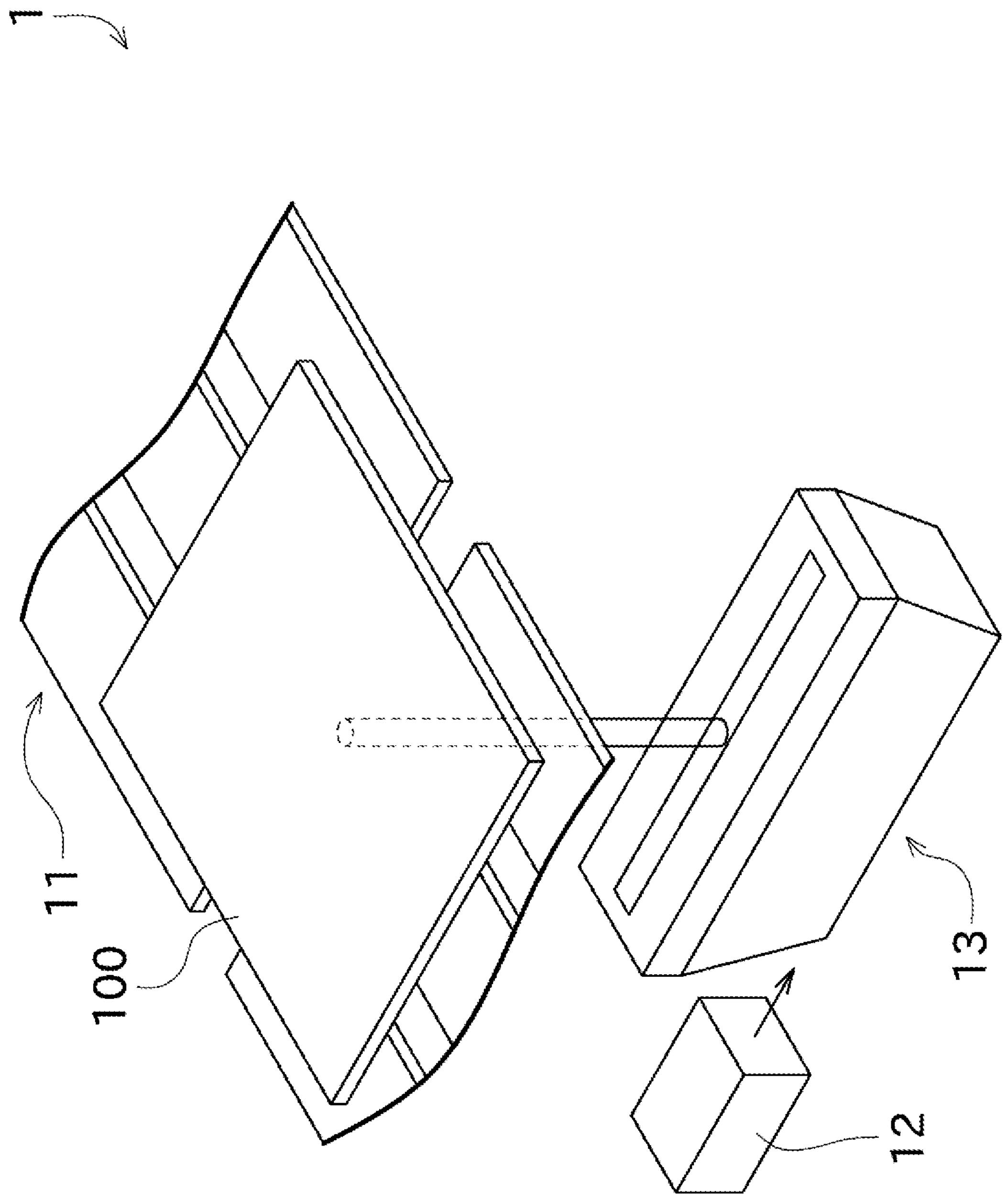
FIG. 1 is a perspective view of a laser processing device according to an embodiment of the present invention.

Next, embodiments of the present invention will be described with reference to the drawings. First, a configuration of a laser processing device 1 is described with reference to FIG. 1. FIG. 1 is a perspective view of the laser processing device 1. The laser processing device 1 is a device that processes a workpiece (target to be irradiated) 100 by irradiating the workpiece 100 with a laser.

The workpiece 100 of this embodiment is, for example, an electromagnetic steel plate, a silicon substrate, a resin film, or the like. Note that the workpiece 100 may be made of other materials. Moreover, the workpiece 100 is not limited to a plate shape, and may be, for example, a block shape.

The laser processing device 1 of this embodiment performs ablation processing in which the workpiece 100 is evaporated and processed by irradiating the workpiece 100 with the laser. The laser processing device 1 may be configured to perform thermal processing in which the workpiece 100 is melted and processed by laser heat. The laser processing device 1 performs cutting processing of the workpiece 100. The processing that the laser processing device 1 performs on the workpiece 100 is not limited to cutting, but may also be processing that removes the surface of the workpiece 100 along a predetermined shape, for example. Alternatively, the processing performed by the laser processing device 1 may be processing to melt the workpiece 100 for welding the workpiece 100 or the like.

The laser may be visible light or may be electromagnetic waves in a wavelength band other than visible light. Furthermore, in this embodiment, "light" includes not only visible light but also electromagnetic waves having a shorter wavelength or longer wavelength than visible light.

As shown in FIG. 1, the laser processing device 1 includes a conveyance part 11, a laser generator 12, and a laser scanning device 13.

The conveyance part 11 is a belt conveyor and conveys the placed workpiece 100 in a predetermined direction. The conveyance part 11 can conveys the workpiece 100 in a conveyance direction and can stop the workpiece 100 at a predetermined position. The conveyance part 11 conveys the workpiece 100 and stops the workpiece 100 at a position for performing laser processing. The conveyance part 11 may be a roller conveyor, or may be configured to grip and convey the workpiece 100. The conveyance part 11 may be omitted and the workpiece 100 fixed so as not to move may be processed by irradiating the laser.

The laser generator 12 generates a pulsed laser having a short time width by pulse oscillation. The time width of the pulsed laser is not particularly limited, and the laser is generated at short time intervals such as nanoseconds, picoseconds, or femtoseconds. The laser generator 12 may be configured to generate a CW laser by continuous wave oscillation.

The laser scanning device 13 guides the laser generated by the laser generator 12 and irradiates the workpiece 100 with the laser. The laser scanning device 13 processes the workpiece 100 by guiding the focused laser so that the surface of the workpiece 100 is irradiated with the focused laser.

Figure 2:
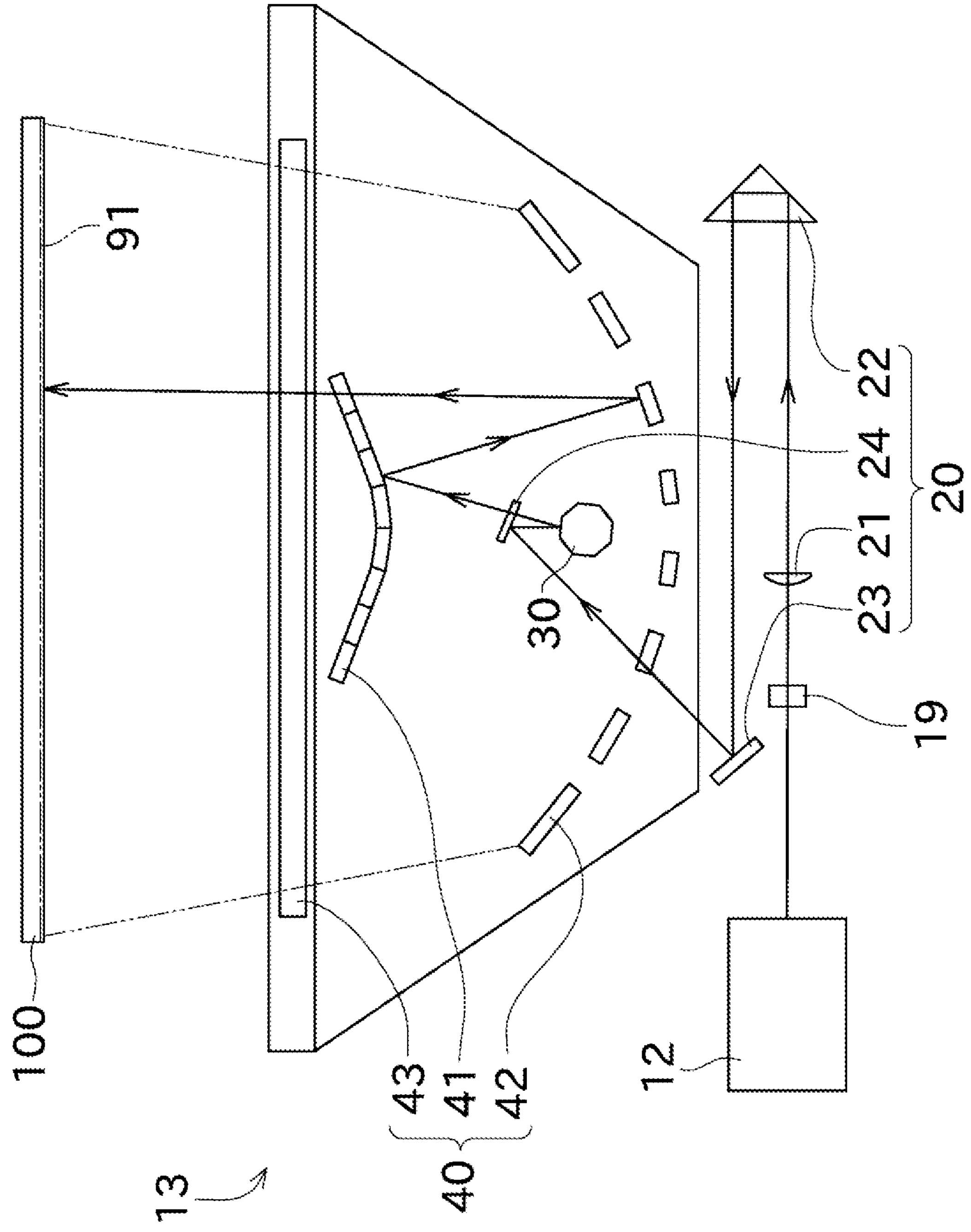
FIG. 2 is a diagram showing an optical path of a laser generated by a laser generator irradiating the workpiece.

Hereinafter, this laser scanning device 13 will be explained in detail with reference to FIGS. 2 and 3. As shown in FIG. 2, the laser scanning device 13 includes a beam expander 19, a first light guide part 20, a polygon mirror 30, and a second light guide part 40. At least one optical component is arranged inside the housing of the laser scanning device 13.

The beam expander 19 expands the laser generated by the laser generator 12 in a predetermined direction (first direction described below). The beam expander 19 includes, for example, a combination of a concave lens and a convex lens. The beam shape (cross-sectional shape of the laser) of the laser generated by the laser generator 12 is circular. The beam shape changes to an ellipse by passing through the beam expander 19.

The first light guide part 20 is composed of optical components that guide the laser generated by the laser generator 12 to the polygon mirror 30. The first light guide part 20 includes, in order from the laser generator 12 along a laser optical path, a first cylindrical lens (first condense part) 21, an introduction prism 22, a first introduction mirror 23, and a second introduction mirror 24.

Figure 4:
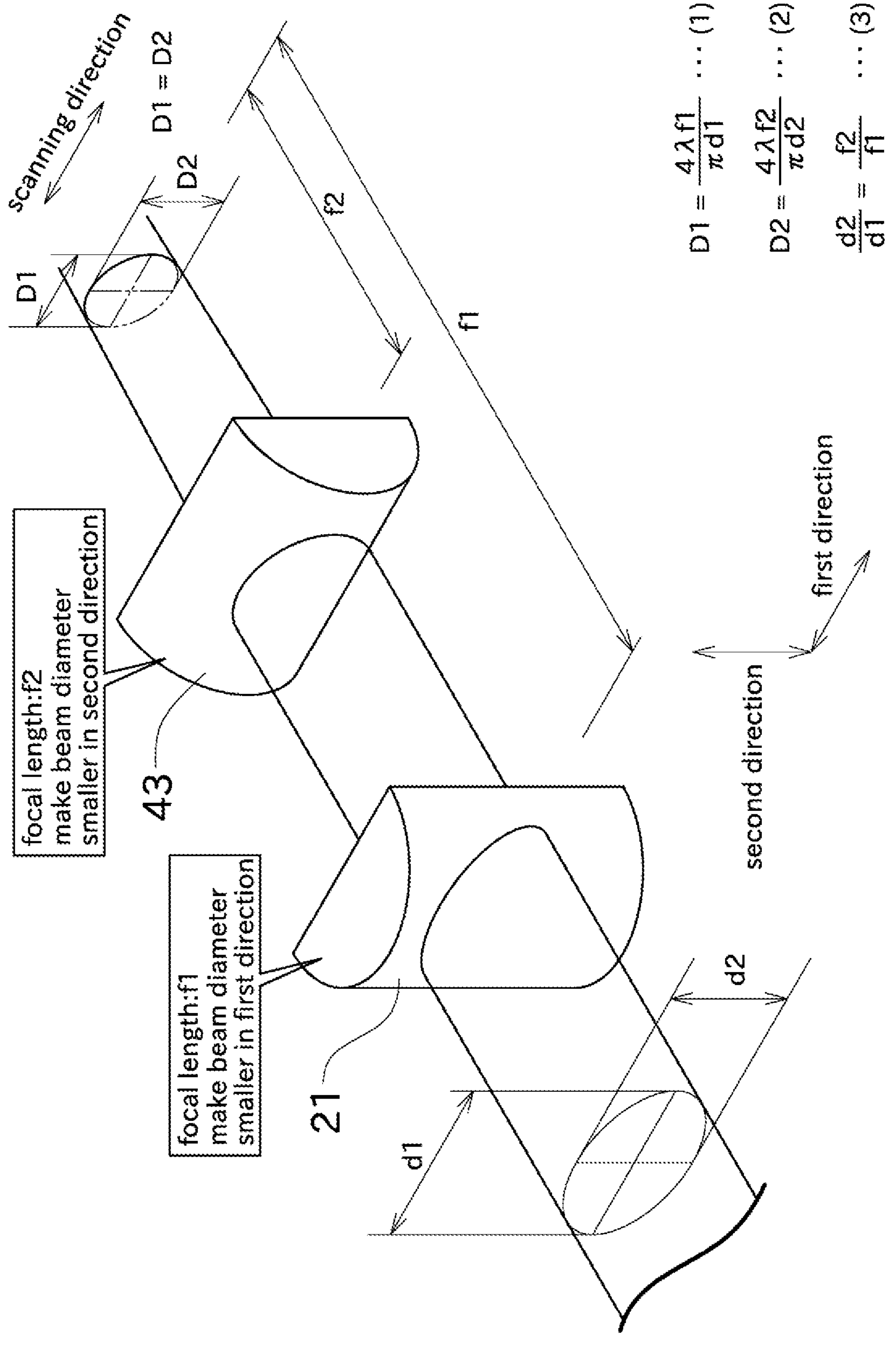
FIG. 4 is a perspective view showing that a beam shape becomes circular when a laser is focused by a first cylindrical lens and a second cylindrical lens.

As shown in FIG. 4, the first cylindrical lens 21 focuses the laser generated by the laser generator 12. Specifically, the first cylindrical lens 21 focuses the laser so that the beam diameter in the first direction becomes small. The first direction is a direction parallel to the laser scanning direction. In the specification, the beam diameter in the first direction of the laser incident on the first cylindrical lens 21 is indicated as d1. The beam diameter of the laser in the first direction gradually becomes smaller as the laser passes through the first cylindrical lens 21, and becomes the smallest at or near the surface of the workpiece 100.

The introduction prism 22, the first introduction mirror 23, and the second introduction mirror 24 guide the laser that has passed through the first cylindrical lens 21 to the polygon mirror 30. The introduction prism 22, the first introduction mirror 23, and the second introduction mirror 24 constitute an optical unit on the optical path upstream side of the polygon mirror 30 in order to secure the optical path length necessary for positioning the focal point on the surface of the workpiece 100. The optical components constituting the first light guide part 20 shown in this embodiment can be omitted, and other prisms or mirrors may be added between the first cylindrical lens 21 and the polygon mirror 30.

As shown in FIG. 2, the polygon mirror 30 is formed into a regular polygonal shape (regular octagonal shape in this embodiment) as a whole. Specifically, planar mirrors are placed at positions of facets corresponding to each peripheral side of the regular polygon. The polygon mirror 30 is configured to be rotatable at, for example, a constant angular velocity by receiving power from an electric motor (not shown). The rotational axis direction of the polygon mirror 30 and the viewpoint direction in FIG. 2 (that is, the viewpoint direction in which the polygon mirror 30 is a regular polygonal shape) are the same.

The laser generated by the laser generator 12 and reflected by the polygon mirror 30 is guided by the second light guide part 40 and irradiated to the workpiece 100. At this situation, the laser irradiation position changes depending on the angle of the reflective surface of the polygon mirror 30. In other words, as the polygon mirror 30 rotates, the laser from the laser generator 12 is deflected, and the reflection angle of the laser on the polygon mirror 30 changes. Thereby, the laser is scanned on the workpiece 100. Scanning means changing the irradiation position of light such as a laser in a predetermined direction. Hereinafter, the scanning direction of the laser will be simply referred to as the scanning direction. The workpiece 100 is processed along the scanning direction.

Rotation of the polygon mirror 30 make the laser introduced by the second introduction mirror 24 emit so that the laser angularly at a constant speed. The second light guide part 40 reflects the light emitted from the polygon mirror 30 and guides the laser to the scanning line 91. By changing the rotation angle of the polygon mirror 30, the irradiation position sequentially moves in the scanning direction along the scanning line 91 on the workpiece 100.

The second light guide part 40 has a plurality of reflective surfaces and the second light guide part 20 reflects the laser reflected by the polygon mirror 30 and guides the laser to the surface of the workpiece 100. The second light guide part 40 includes a plurality of first irradiation mirrors 41, a plurality of second irradiation mirrors 42, and a second cylindrical lens (second condense part) 43.

Hereinafter, with reference to FIG. 3, arrangements and functions of the first irradiation mirror 41 and the second irradiation mirror 42 will be described. FIG. 3 is a schematic figure showing a positional relationship between a deflection center C, a first irradiation mirror 41, a second irradiation mirror 42, and a scanning line 91.

Figure 3:
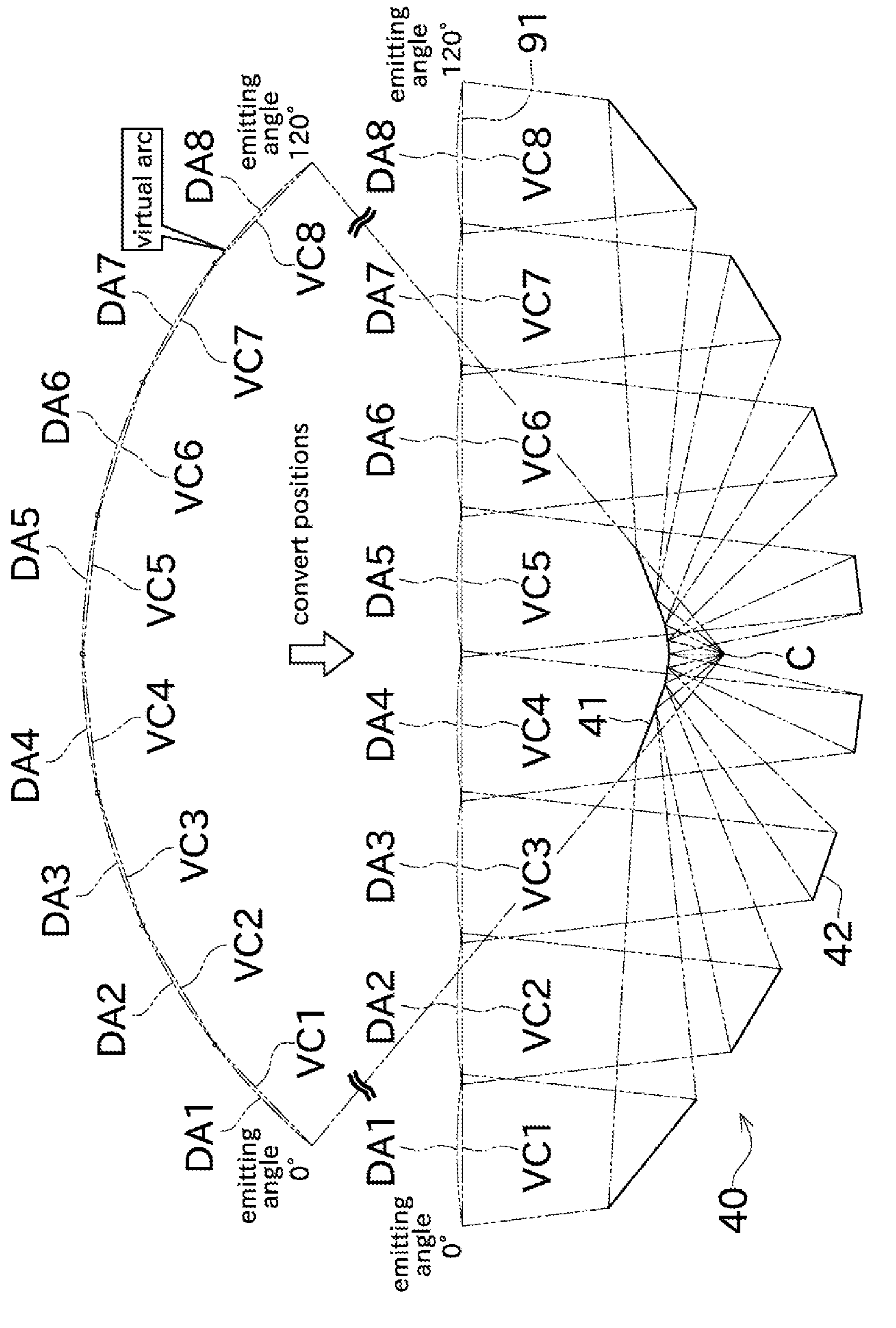
FIG. 3 is a schematic diagram showing a positional relationship between a deflection center of a polygon mirror, a first irradiation mirror, a second irradiation mirror, and a scanning line.

If the second light guide part 40 is not present, as shown in the upper view of FIG. 3, the focus point of the laser (a point distance away from the laser generator 12 along the optical path) draws an arc-shaped trajectory as the rotation angle of the polygon mirror 30 changes by an amount corresponding to one side of the regular polygon. The center of this trajectory is the deflection center C, where the laser is deflected by the polygon mirror 30, and the radius of the trajectory is the optical path length from said deflection center C to the focus point. On the other hand, the scanning line 91 extends in a straight line in the scanning direction, unlike the arc-shaped trajectory. As a result, the distance from the irradiation position on the scanning line 91 to the focus point changes according to the irradiation position. Therefore, considering the optical path length from the deflection center C mentioned above to any irradiation position on the scanning line 91, the optical path length is not constant and varies according to the irradiation position.

A second light guide part 40 is provided to solve this problem, reflecting the laser from the polygon mirror 30 at least twice before the workpiece 100 (scanning line 91). The second light guide part 40 is arranged so that the optical path length from the reflective surface of the polygon mirror 30 to any irradiation position on the scanning line 91 on the workpiece 100 is approximately constant for all irradiation positions, respectively.

The second light guide part 40 in this embodiment has a first irradiation mirror 41 which reflects the laser from the polygon mirror 30, and a second irradiation mirror 42 which further reflects the laser from the first irradiation mirror 41. In other words, the second light guide part 40 reflects the laser from the polygon mirror 30 twice. The second light guide part 40 includes a first irradiation mirror 41 and a second irradiation mirror 42. The second light guide part 40 may be configured with optical components arranged such that the laser is reflected three or more times.

As described above, if the first irradiation mirror 41 and the second irradiation mirror 42 were not present, the focus point of trajectory of the laser is an arc (hereinafter referred to as a virtual arc) around the deflection center C as the emitting angle of light output changes. The radius R of the virtual arc is the optical path length from the deflection center C to the focus point. The first irradiation mirror 41 and the second irradiation mirror 42 bend the optical path from the deflection center C to the focus point, thereby transforming the virtual arc to extend generally in a straight line in the scanning direction on the workpiece 100. In detail, the positions of the divided arcs DA1, DA2, . . . , which split the virtual arcs are transformed by the second light guide part 40 so that the orientation of each of its strings VC1, VC2, . . . is approximately equal to the scanning line 91.

The first irradiation mirror 41 and the second irradiation mirror 42 each have a plurality of reflective surfaces. The split angle range is a range of the emitting angle of the laser from the polygon mirror 30 divided into multiple ranges. A split arc DA1, DA2, . . . is a trajectory drawn by a point (focus point) at a certain distance from the laser generator 12 along the light as the emitting angle of the light changes in the split angle range. In such a way that the split arcs VC1, VC2, . . . of the split arcs DA1, DA2, . . . are in the same direction as the scanning direction (so that they line up in the scanning direction), the first irradiation mirror 41 and the second irradiation mirror 42 reflect the light multiple times.

The specific method for transforming the position of the virtual arc to match the scanning line 91 will be briefly described. First, by dividing the virtual arc into equally spaced portions, a plurality of split arcs DA1, DA2, . . . are obtained. Next, we obtain a plurality of virtual strings VC1, VC2, . . . corresponding to each of the plurality of split arcs DA1, DA2, . . . . Next, we obtain a plurality of virtual strings VC1, VC2, . . . corresponding to each of the plurality of split arcs DA1, DA2, . . . . Next, the positions and directions of the reflective surfaces possessed by the first irradiation mirror 41 and the second irradiation mirror 42 respectively are determined so that a plurality of virtual strings VC1, VC2, . . . are sequentially lined up in a straight line in the scanning direction on the workpiece 100.

When the scanning line 91 is formed in this manner, the two points at both ends of the split arc DA1, DA2, . . . are relocated on the scanning line 91, and the split arc DA1, DA2, . . . (i.e., the curve connecting two points) is relocated downstream in the optical axis direction from the scanning line 91. The focus point of the laser moves along the split arc DA1, DA2, . . . with the position transformed in this way.

When the virtual arc is divided to multiple split arcs DA1, DA2, . . . , the split arcs DA1, DA2, . . . approximate the corresponding virtual strings VC1, VC2, . . . with high accuracy. Therefore, the optical path length from the deflection center C of the polygon mirror 30 to any irradiation position on the scanning line 91 is approximately constant over all irradiation positions. Since the split arcs DA1, DA2, . . . are in high accuracy approximation with the corresponding virtual strings VC1, VC2, . . . , the behavior of the focus point in the respective split arcs DA1, DA2, . . . approximates with high accuracy the constant velocity linear motion along the scanning line 91.

As the number of divisions of the split arc DA1, DA2, . . . increases, the distance between the midpoint of the virtual string VC1, VC2, . . . and the midpoint of the split arc DA1, DA2, . . . decreases, and the locus of focus point approaches the virtual string VC1, VC2, . . . . This allows for a high degree of consistency in optical path length. The number of divisions can be determined as appropriate depending on the error allowed by the laser scanning device 13.

The laser reflected by the second irradiation mirror 42 passes through the second cylindrical lens 43 and is irradiated to the workpiece 100. As shown in FIG. 4, the second cylindrical lens 43 focuses the laser so that the beam diameter in the second direction becomes small. The second direction is a direction perpendicular to the laser scanning direction. In other words, the second direction is a direction perpendicular to the first direction. In the specification, the beam diameter in the second direction of the laser incident on the second cylindrical lens 43 is indicated as d2. The beam diameter of the laser in the second direction gradually becomes smaller as the laser passes through the second cylindrical lens 43, and becomes the smallest at or near the surface of the workpiece 100. Thereby, the workpiece 100 can be processed by focusing the laser.

Next, focusing of the laser by the first cylindrical lens 21 and the second cylindrical lens 43 will be described in detail with reference to FIG. 4. FIG. 4 is a hypothetical diagram in which the optical path of the laser is converted to be a straight line in order to clearly show the convergence of the laser.

As shown in FIG. 4, the first cylindrical lens 21 is arranged so that the central axis of the cylinder coincides with the second direction. The first cylindrical lens 21 is arranged so that the curved surface faces upstream of the laser and the flat surface faces downstream of the laser. The optical path length from the first cylindrical lens 21 to the workpiece 100 is equal to the focal length f1 of the first cylindrical lens 21.

As shown in FIG. 4, the second cylindrical lens 43 is arranged so that the central axis of the cylinder coincides with the first direction. The second cylindrical lens 43 is arranged so that the curved surface faces upstream of the laser and the flat surface faces downstream of the laser. The optical path length from the second cylindrical lens 43 to the workpiece 100 is equal to the focal length f2 of the second cylindrical lens 43.

The beam diameter in the first direction and the second direction becomes smaller by passing through the first cylindrical lens 21 and the second cylindrical lens 43, and the workpiece 100 is irradiated with the laser. Hereinafter, the beam diameter in the first direction of the laser irradiated to the workpiece 100 is indicated as D1, and the beam diameter in the second direction of the laser irradiated to the workpiece 100 is indicated as D2. In this embodiment, optical components are designed so that D1=D2 (in other words, the shape of the laser beam irradiated to the workpiece 100 is circular).

Hereinafter, conditions for making the beam shape of the laser irradiated to the workpiece 100 circular will be described. It is generally known that when an incident beam diameter is d, a focal length is f, a laser wavelength is $\lambda$, and a minimum beam diameter is D, $D=4\lambda f/\pi d$ satisfies. When this equation is applied to light condensing in the first direction, equation (1) shown in FIG. 4 is obtained. In the same way, when this equation is applied to condensing light in the second direction, equation (2) shown in FIG. 4 is obtained. By substituting D1=D2, which is a condition for making the beam shape circular, and rearranging equation (1) and equation (2), equation (3) can be derived.

The focal lengths f1 and f2 are fixed values determined by product specifications of the first cylindrical lens 21 and the second cylindrical lens 43, respectively. Therefore, equation (3) is satisfied by calculating d1 and d2 such that d2/d1=f2/f1 substantially satisfies, and by arranging the beam expander 19 to realize this. As a result, D1=D2 is satisfied, and the shape of the laser beam irradiated to the workpiece 100 becomes circular. "substantially satisfy" means not only when both sides of the equation have the exact same value, but also when both sides of the equation have roughly the same value (for example, when the difference between both sides is 10% or less).

Circular of the beam shape enable widths of vertical lines and horizontal lines to be the same when patterning is performed using a laser. While the laser passes through the first light guide part 20 and the second light guide part 40, the laser is not sufficiently focused, so the heat input density from the laser to each optical component of the first light guide part 20 and the second light guide part 40 does not become very high. As a result, damage to these optical components can be prevented.

As described above, the laser scanning device 13 of this embodiment includes the first light guide part 20, the polygon mirror 30, and the second light guide part 40, and executes the following laser scanning method. The first light guide part 20 reflects and guides the laser generated by the laser generator 12 (first light guide process). The polygon mirror 30 has a reflective surface arranged in a polygonal shape (radially arranged), and reflects the laser guided by the first light guide part 20 on the reflective surface while rotating (polygon mirror reflect process). The second light guide part 40 further reflects the laser reflected by the reflective surface of the polygon mirror 30 and guides the laser so that the workpiece 100 is irradiated with the laser (second light guide process). The first light guide part 20 includes a first cylindrical lens 21 for condensing the laser so that the beam diameter in the first direction of the laser becomes smaller. The second light guide part 40 includes a second cylindrical lens 43 for condensing the laser so that the beam diameter in the second direction perpendicular to the first direction of the laser becomes smaller.

As a result, the laser generated by the laser generator 12 is focused in two directions, so the workpiece 100 can be irradiated with a laser whose cross-sectional shape (beam shape) is circular or close to circular.

In the laser scanning device 13 of this embodiment, the focal length of the first cylindrical lens 21 is f1, and the diameter of the laser beam incident on the first cylindrical lens 21 in the first direction is d1. The focal length of the second cylindrical lens 43 is f2, and the diameter of the laser beam incident on the second cylindrical lens 43 in the second direction is d2. The laser is irradiated so that d2/d1=f2/f1 substantially satisfies.

Thereby, the shape of the laser beam irradiated to the workpiece 100 can be made substantially circular.

While the above is a description of a suitable embodiment of the present invention, the configuration described above can be modified as follows, for example.

In the above embodiment, the cylindrical lenses are used as optical components for condensing the laser, but other optical components (concave lens, convex lens) or a combination thereof may be used instead of the cylindrical lenses.

In the above embodiment, the position of the polygon mirror 30 in the rotational axis direction is fixed and cannot be changed, but a push/pull bolt (position adjustment tool) or the like may be provided for changing the position of the polygon mirror 30 in the rotational axis direction.

The laser scanning device 13 may be configured to reflect the laser by using a mirror instead of the introduction prism 22.

The invention claimed is:

1. A laser scanning device, comprising:

a first light guide part reflecting and guiding a laser generated by a laser generator;

a polygon mirror having reflective surfaces arranged in a polygonal shape, the polygon mirror reflecting the laser guided by the first light guide part on the reflective surface while rotating; and a second light guide part reflecting the laser reflected by the reflective surface of the polygon mirror and guiding the laser so that the laser is irradiated to a workpiece, wherein the first light guide part includes a first condense part condensing the laser so that a beam diameter in a first direction of the laser becomes smaller, wherein the second light guide part includes a second condense part condensing the laser so that a beam diameter in a second direction perpendicular to the first direction of the laser becomes smaller, and wherein a focal length of the first condense part is f1 and a diameter of the laser incident on the first condense part in the first direction is d1, wherein a focal length of the second condense part is f2 and a diameter of the laser incident on the second condense part in the second direction is d2, and wherein the laser is irradiated so that d2/d1−f2/f1 substantially satisfies.

2. The laser scanning device according to claim 1, wherein the first condense part is a first cylindrical lens and the first cylindrical lens condenses the laser so that the beam diameter of the laser in the first direction becomes smaller, and wherein the second condense part is a second cylindrical lens and the second cylindrical lens condenses the laser so that the beam diameter of the laser in the second direction becomes smaller.

3. A laser scanning method, comprising:

(a) using a first light guide part, reflecting and guiding a laser generated by a laser generator;

(b) using a polygon mirror, reflecting while rotating the laser guided by the first light guide part, the polygon mirror having reflective surfaces arranged in a polygonal shape; and (c) guiding the laser reflected by the reflective surface of the polygon mirror so that a second light guide part reflects and guides the laser and the laser is irradiated to a workpiece, wherein step (a) includes a substep of condensing the laser so that a beam diameter in a first direction of the laser becomes smaller by using a first condense part, wherein step (c) includes a substep of condensing the laser so that the beam diameter in a second direction perpendicular to the first direction of the laser becomes smaller by using a second condense part, and wherein a focal length of the first condense part is f1 and a diameter of the laser incident on the first condense part in the first direction is d1, wherein a focal length of the second condense part is f2 and a diameter of the laser incident on the second condense part in the second direction is d2, and wherein the laser is irradiated so that d2/d1=f2/f1 substantially satisfies.

* * * * *